No. 886,232. PATENTED APR. 28, 1908.
J. C. METCALF.
REVERSING MECHANISM FOR TRACTION ENGINES.
APPLICATION FILED JUNE 21, 1906.
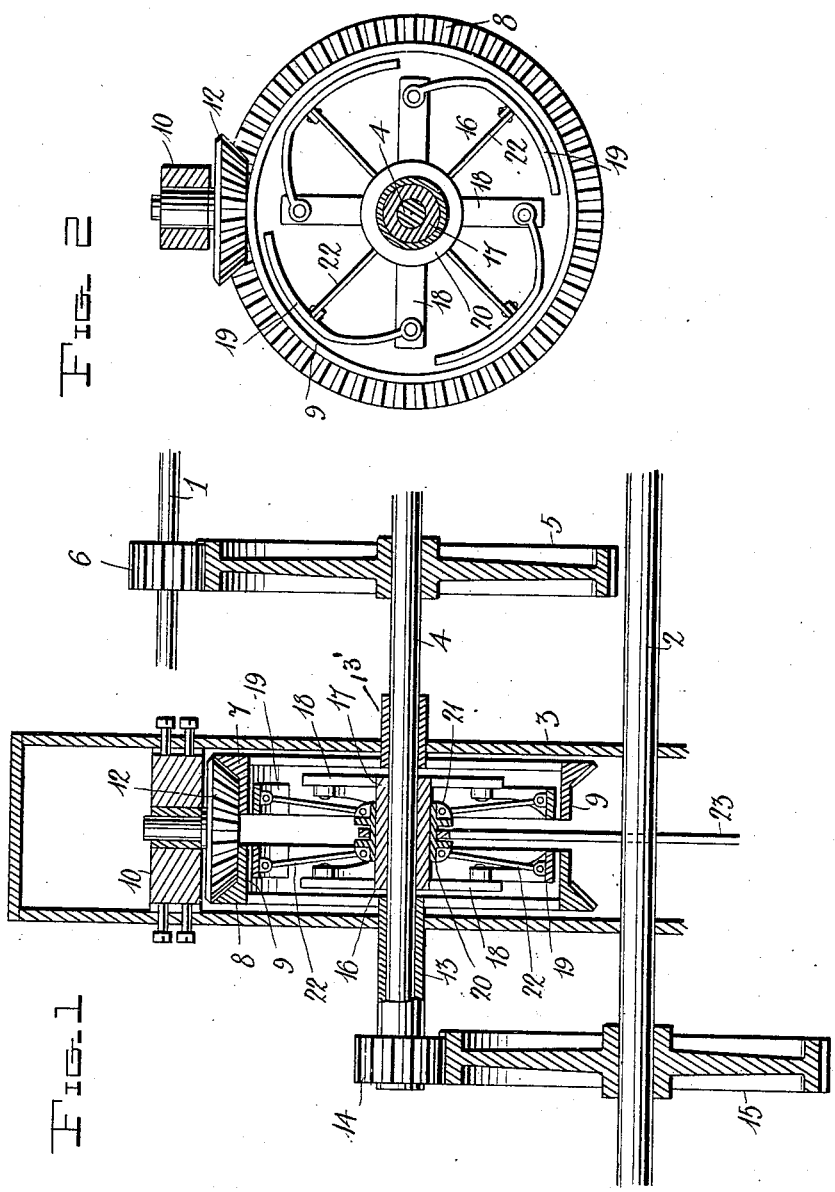
Witnesses
Inventor
John C. Metcalf
by
Attorneys

UNITED STATES PATENT OFFICE.

JOHN C. METCALF, OF MERCERSBURG, PENNSYLVANIA.

REVERSING MECHANISM FOR TRACTION-ENGINES.

No. 886,232.

Specification of Letters Patent.

Patented April 28, 1908.

Application filed June 21, 1906. Serial No. 322,767.

*To all whom it may concern:*

Be it known that I, JOHN C. METCALF, a citizen of the United States, residing at Mercersburg, in the county of Franklin and State of Pennsylvania, have invented certain new and useful Improvements in Reversing Mechanism for Traction-Engines; and I do declare the following to be a full, clear, and exact description of the invention, such as will enable others skilled in the art to which it appertains to make and use the same.

This invention relates to improvements in reversing mechanism for traction engines.

The object of the invention is to provide a reversing mechanism of this character having an improved clutch mechanism through which motion from the engine shaft is imparted to the drive shaft or axle to turn the same in one direction or the other.

With the above and other objects in view, the invention consists of certain novel features of construction, combination and arrangement of parts as will be hereinafter described and claimed.

Figure 1 is a diagrammatic sectional view of a reversing mechanism constructed in accordance with the invention; and Fig. 2 is a cross sectional view through the clutch shaft, showing an inner side view of the clutch.

Referring more particularly to the drawings, 1 denotes the engine shaft, 2 denotes the traction or drive wheel shaft, on which are fixedly mounted the traction wheels or drivers of the engine. Revolubly mounted in a supporting frame 3 is a clutch shaft 4, on one end of which is mounted a gear wheel 5, which meshes with a gear pinion 6 on the engine shaft, whereby said clutch shaft is driven by the engine shaft.

Revolubly mounted on the clutch shaft 4 in the frame 3 are beveled gear wheels 7 and 8 having on their inner faces inwardly-projecting annular flanges 9, as shown. Arranged in the frame 3 is a bearing block 10, in which is journaled an idle beveled gear 12 adapted to mesh with the gear wheels 7 and 8 on the clutch shaft 4. The gear wheels 7 and 8 are provided with elongated hubs or bearing sleeves 13 and 13', and on the outer end of the one 13 is mounted a gear pinion 14 which meshes with a spur gear wheel 15 fixedly mounted upon the traction wheel shaft or axle 2.

Keyed to the clutch shaft 4 is a clutch device 16, said clutch comprising a centrally-disposed hub 17, on the outer ends of which are arranged radially-projecting spider arms 18. The arms 18 have pivotally mounted on their outer ends segmental friction clutch shoes 19, which are adapted frictionally to engage with the inner surface of the flanges 9 on the beveled gear wheels 7 and 8, whereby motion from the shaft 4 will be imparted to one or the other of said wheels, as will be understood.

Slidably mounted on the hub 17 is a shifting collar 20, on each side of which are formed radially-disposed apertured ears or lugs 21, which are connected by links 22 to the clutch shoes 19, whereby when said collar is shifted in one direction or the other the links 22 on one side will be straightened or forced outwardly, thereby throwing the clutch shoes connected thereto into frictional engagement with the flange 9 of the adjacent gear wheels 7 or 8, thus locking the same to the clutch shaft 4.

Any suitable mechanism may be employed for shifting the clutch collar 20, said mechanism being here shown as a pivotally mounted lever 23.

When the clutch collar is shifted to the left to throw the clutch shoes on this side of the device into engagement with the beveled gear 8, the pinion 14 and the gear 15 on the drive wheel shaft will be driven in one direction while upon a movement of the clutch collar in the opposite direction or to the right, the clutch shoes on this side of the device will be engaged with the beveled-gear wheel 7 and the shoes on the left hand side will be disengaged from the gear wheel 8 to which motion will now be imparted in the opposite direction through the idle gear 12 which is engaged by both the beveled gears 7 and 8, as hereinbefore described. The reverse movement of the beveled gear 8 will be imparted to the traction or drive wheel shaft 2, the pinion 14 and gear 15 in the same manner as when directly driven by the engagement of the clutch shoes with the gear 8.

From the foregoing description, taken in connection with the accompanying drawings, the construction and operation of the invention will be readily understood without requiring a more extended explanation.

Having thus described my invention, what I claim as new and desire to secure by Letters Patent, is:—

A reversing mechanism for traction engines comprising a frame with a bearing block, a beveled gear wheel journaled therein, flanged gears each having hubs rotatably mounted in said frame, a pinion on one of the hubs, a clutch shaft rotatably mounted in said hubs with a gear wheel thereon, a shaft geared to the gear wheel of the clutch shaft, a drive wheel shaft geared to the pinion on the hub, a hub keyed to the clutch shaft having radial arms pivoted segmental shoes thereon, a shifting collar on the keyed hub having lugs, and links connecting said lugs to the shoes of the radial arms to cause the segmental portions of the shoes to frictionally contact with the inner surfaces of the flanged portions of said beveled gear wheels, substantially as specified.

In testimony whereof I have hereunto set my hand in presence of two subscribing witnesses.

JOHN C. METCALF.

Witnesses:
W. E. McKinstry,
J. C. Rankin.